United States Patent [19]

Hammou et al.

[11] Patent Number: 4,619,822
[45] Date of Patent: Oct. 28, 1986

[54] NOVEL PROCESS FOR THE SYNTHESIS OF VANADIUM OXIDE, $V_6O_{13}$

[75] Inventors: Abdelkader Hammou, Grenoble; Philippe Rigaud, Vienne; Catherine Rousseau, La Roche sur Yon, all of France

[73] Assignee: Societe Nationale Elf Aquitaine, Courbevoie, France

[21] Appl. No.: 726,621

[22] Filed: Apr. 24, 1985

[30] Foreign Application Priority Data

Apr. 24, 1984 [FR] France .................................. 84 06415

[51] Int. Cl.[4] ............................................. C01G 31/02
[52] U.S. Cl. ..................................................... 423/592
[58] Field of Search .......................................... 423/592

[56] References Cited

U.S. PATENT DOCUMENTS 2,702,739  2/1955  Kelly ..................................... 423/592
4,315,905  2/1982  Bens et al. ............................ 423/592
4,486,400  12/1984 Riley ..................................... 423/592

OTHER PUBLICATIONS

Trau, "J. of Thermal Analysis", vol. 16, 1979, pp. 201–204.

*Primary Examiner*—H. T. Carter
*Attorney, Agent, or Firm*—Oblon, Fisher, Spivak, McClelland & Maier

[57] ABSTRACT

Process for the synthesis of vanadium $V_6O_{13}$ by reduction of $V_2O_5$ in the presence of reducing gas. The reducing gas is a mixture of CO and $CO_2$.

5 Claims, No Drawings

NOVEL PROCESS FOR THE SYNTHESIS OF VANADIUM OXIDE, $V_6O_{13}$

BACKGROUND OF THE INVENTION

1. Field of the Invention

The present invention concerns a novel process for the synthesis of vanadium oxide $V_6O_{13}$ by reduction of $V_2O_5$ in the presence of a mixture of reducing gas.

2. Discussion of the Background

Different processes for the synthesis of vanadium oxide $V_6O_{13}$ have already been proposed. For example, it is possible to reduce $V_2O_5$ by utilizing metallic vanadium, at high temperature and with a very long contact time, from two to three days.

It is also possible to foresee a reduction by $NH_3$ or hydrogen. These different processes are long and complicated, since, for example, the synthesis by reduction to metallic vanadium requires a very strong static vacuum. Furthermore, they have the drawback of supplying $V_6O_{12}$ in the form of needles.

One of the concerned applications for vanadium oxide disclosed according to the present invention is the obtention of positive electrodes for a lithium generator and the electrolyte of which is a lithium salt in solution in a macro-molecular material.

Such a generator is, for example, disclosed in European Pat. No. 1399. In this type of generator, it is foreseen to utilize $V_6O_{13}$ as insertion material adapted for lithium atoms to be inserted. In order to obtain good performances for the reaction, the applicants have discovered that it was preferable that the vanadium oxide be present in the forms of grains, i.e. having a morphology entirely different to that obtained with the reduction methods utilizing metallic vanadium, $NH_3$ or hydrogen.

On the other hand, in order to obtain such positive electrodes, it is preferable to have as pure a product as possible, and, in particular, a product that is quasi-free of $V_2O_5$; this latter, when it is present in large quantities in the electrode material, distorts the discharge curves and, in particular, provokes a sharp variation of the discharge voltage.

SUMMARY OF THE INVENTION

In order to obtain a $V_6O_{13}$ product in the form of grains, the inventors have discovered that it is possible to utilize a synthesis operating the reduction of $V_2O_5$ by a reducing mixture of carbon monoxide and carbon dioxide.

DETAILED DESCRIPTION OF THE PREFERRED EMBODIMENTS

A synthesis of $V_6O_{13}$ via the reduction of $V_2O_5$ is set out in the publication I.A. VASIL'EVA, S.N. SAFRONOVA MOSK. Gos. Univ. Im. Lomonosova. Moscow, Sh. Fiz- Khim 1976-50-2193. This article gives the values of the thermodynamic constants of $V_6O_{13}$. These values allow to calculate at a determined temperature, the exact composition of the $CO/CO_2$ reducing mixture in order to form the compound $V_6O_{13}$. At 600° C., it is necessary to utilize a mixture that has a very low CO content—of about $10^{-2}\%$ of CO by % volume, which corresponds to a very low oxygen partial pressure of about $10^{-4}$ atmosphere. If, despite the practical difficulties which this article indicates, the experiment is attempted, a mixture of several vanadium oxides is obtained, but not, or practically not, of $V_6O_{13}$ which could be explained by its instability to this oxygen pressure.

In order to obtain a pressure that corresponds to the different requirements set out herein-above, in particular, a product which is practically free of impurities and has a grain-type morphological structure, the applicants have perfected a novel process for the synthesis of vanadium from $V_2O_5$ by reduction of $V_2O_5$ in the presence of a $CO/CO_2$ mixture, this reduction being carried out at high temperature, and wherein for the said process a gaseous $CO/CO_2$ mixture is used comprising from 5 to 15% and preferably 10% by volume CO, the contact time being long enough to obtain a quasi-total reduction of the vanadium oxide into $V_6O_{13}$.

According to one particular embodiment, the gaseous mixture is caused to pass on the oxide according to a volumic flow-rate comprised between 15 and 20 liters per hour (l/h) for a duration longer than 2 hours, and preferably a duration comprised between 4 and 5 hours.

Preferably, the reaction temperature is about 600° C.

But, the advantages and the characteristics of the invention will become apparent from reading through the following examples, given solely by way of non-limitative illustration.

A reaction device is utilized, constituted by a mould in refractory cement containing an electrically controlled heating system. The cement mould is surrounded by an insulating system. The control system operates up to 1250° C.

Into the reaction device is placed about 5 g of $V_2O_5$ comprising less than 0.2 weight% of impurities. A gaseous $CO/CO_2$ at 10% volume of CO mixture is passed into the said reaction device at a flow-rate of 17 l/hour, the reaction device already being at a temperature of 600° C. After 4 h 30 minutes of reaction, the circulation of the gaseous mixture is interrupted. When the oven has cooled, pure $CO_2$ is injected in order to blow off the system.

X-ray analysis of the product has allowed to show that practically pure $V_6O_{13}$ had been obtained, with only slight traces of $V_2O_5$.

If the experiment is repeated with a gaseous mixture that is richer in CO, the product obtained is much less pure.

For experimental conditions set out herein-above, it was observed that the optimal passage time of the gaseous mixture on $V_2O_5$ oxide was 4 h 30 minutes plus 20 minutes of stabilization, since for any duration shorter than 4 hours, a mixture is obtained comprising a considerable part of $V_2O_5$ and possibly $V_7O_{13}$ and these results are repeated for durations longer than 5 hours.

The present invention is not limited to the examples given herein-above, but on the contrary covers all variants.

We claim:

1. In a process for preparing $V_6O_{13}$ by reducing $V_2O_5$ at high temperatures, the improvement comprising reducing $V_2O_5$ with a gaseous mixture of carbon monoxide and carbon dioxide to obtain substantially pure $V_6O_{13}$, wherein the said gaseous mixture contains between 5 and 15 percent by volume of carbon monoxide.

2. The process of claim 1, comprising using about 10% by volume carbon monoxide.

3. The process of claim 1, comprising passing the said gaseous mixture of carbon monoxide and carbon dioxide over the said $V_2O_5$ at a rate of from 15 to 20 liters per hour for at least 2 hours.

4. The process of claim 1, comprising passing the said gaseous mixture of carbon monoxide and carbon dioxide over the said $V_2O_5$ at a rate of from 15 to 20 liters per hour for a length of time of from 4 to 5 hours.

5. The process of claim 1, comprising using a temperature of about 600° C.

* * * * *